(12) United States Patent
Hague et al.

(10) Patent No.: US 7,013,838 B2
(45) Date of Patent: Mar. 21, 2006

(54) BLEACHED EXPANDED PIGSKIN AND PRODUCTS

(76) Inventors: Frank Jay Hague, 3504 San Patricio Dr., Plano, TX (US) 75025; Qing Biao Zhou, No. 99 Yandong Road, Nanyan Town, Pingyang County, Wenzhou City, Zhenjiang Province (CN)

( * ) Notice: Subject to any disclaimer, the term of this patent is extended or adjusted under 35 U.S.C. 154(b) by 0 days.

(21) Appl. No.: 10/995,754

(22) Filed: Nov. 23, 2004

(65) Prior Publication Data

US 2005/0071927 A1    Apr. 7, 2005

Related U.S. Application Data

(63) Continuation-in-part of application No. 10/731,257, filed on Dec. 9, 2003, now Pat. No. 6,827,041.

(30) Foreign Application Priority Data

Dec. 20, 2002  (CN) .................. 021577220 A

(51) Int. Cl.
*A01K 29/00*  (2006.01)

(52) U.S. Cl. .............. 119/709; 119/710; 119/426; 119/315

(58) Field of Classification Search ............. 119/709, 119/710, 711, 702, 707; 426/641, 315
See application file for complete search history.

(56) References Cited

U.S. PATENT DOCUMENTS

| | | | |
|---|---|---|---|
| 3,254,938 A * | 6/1966 | Rodriguez et al. ............ 8/94.27 |
| 3,429,648 A * | 2/1969 | Langley ...................... 8/94.17 |
| 3,574,516 A * | 4/1971 | Heidemann et al. ......... 8/94.16 |
| 3,939,040 A | 2/1976 | Monsheimer et al. |
| 3,997,290 A * | 12/1976 | Del Cueto ................... 8/94.16 |
| 4,119,742 A | 10/1978 | Stupec ........................ 426/641 |
| 4,163,804 A | 8/1979 | Meyer et al. ............... 426/315 |
| 4,224,028 A * | 9/1980 | Thiele ......................... 8/94.18 |
| 4,262,028 A | 4/1981 | Meyer et al. ............... 426/417 |
| 4,333,731 A * | 6/1982 | Schindlmayr et al. ......... 8/436 |
| 4,457,759 A * | 7/1984 | Fekete et al. ................ 8/94.16 |
| 4,484,924 A * | 11/1984 | Pfleiderer et al. ............ 8/94.17 |
| 4,539,210 A | 9/1985 | O'Connell et al. ........... 426/56 |
| 4,544,560 A | 10/1985 | O'Connell .................. 426/104 |
| 4,614,520 A | 9/1986 | Ibello et al. |
| 4,921,720 A * | 5/1990 | Davis ......................... 426/641 |
| 4,960,428 A * | 10/1990 | Christner et al. ............ 8/94.18 |
| 4,960,429 A | 10/1990 | Colom et al. |
| 4,999,024 A | 3/1991 | Scheen |
| 5,096,553 A | 3/1992 | Ross et al. |
| 5,102,422 A | 4/1992 | Christner et al. |
| 5,300,121 A | 4/1994 | Gordon et al. |

(Continued)

*Primary Examiner*—Yvonne R. Abbott
(74) *Attorney, Agent, or Firm*—Geoffrey A. Mantooth

(57) ABSTRACT

Pigskin is processed to provide a bleached, expanded skin used in dog treat or chew products. The raw pigskin is dehaired and then daubed with an alkali mixture of an alkali liquid, alkali enzymes and lime, the mixture having a pH of greater than or equal to 12. The alkali mixture dissolves the colloidal protein. The alkali is removed by alternately rinsing the skin in water and agitating the skin with first ammonium chloride or ammonium sulfate, and then second with ammonium chloride or ammonium sulfate, and pancreatic enzymes. The skin is agitated with sodium carbonate and a degreaser to remove the fat. The skin is then washed with hydrogen peroxide, which bleaches and expands the skin. The skin is then formed into a dog product and dried.

9 Claims, 1 Drawing Sheet

U.S. PATENT DOCUMENTS

| | | |
|---|---|---|
| 5,439,702 A | 8/1995 | French .................. 426/641 |
| 5,714,560 A | 2/1998 | Denzinger et al. |
| 5,834,299 A * | 11/1998 | Andersen ................ 435/265 |
| 5,900,027 A * | 5/1999 | Geihsler et al. ......... 8/94.19 R |
| 6,033,715 A * | 3/2000 | Lynch .................. 426/641 |
| 6,277,420 B1 * | 8/2001 | Andersen et al. ........... 426/92 |
| 6,482,240 B1 * | 11/2002 | Eckmayer et al. ......... 8/94.16 |
| 6,708,531 B1 * | 3/2004 | Thanikaivelan et al. ...... 69/21 |
| 6,957,554 B1 * | 10/2005 | Saravanabhavan et al. .... 69/21 |
| 2002/0142079 A1 | 10/2002 | Chong .................. 426/315 |
| 2002/0142091 A1 | 10/2002 | Zhu .................... 426/641 |
| 2003/0198731 A1 | 10/2003 | Zhang et al. |

* cited by examiner

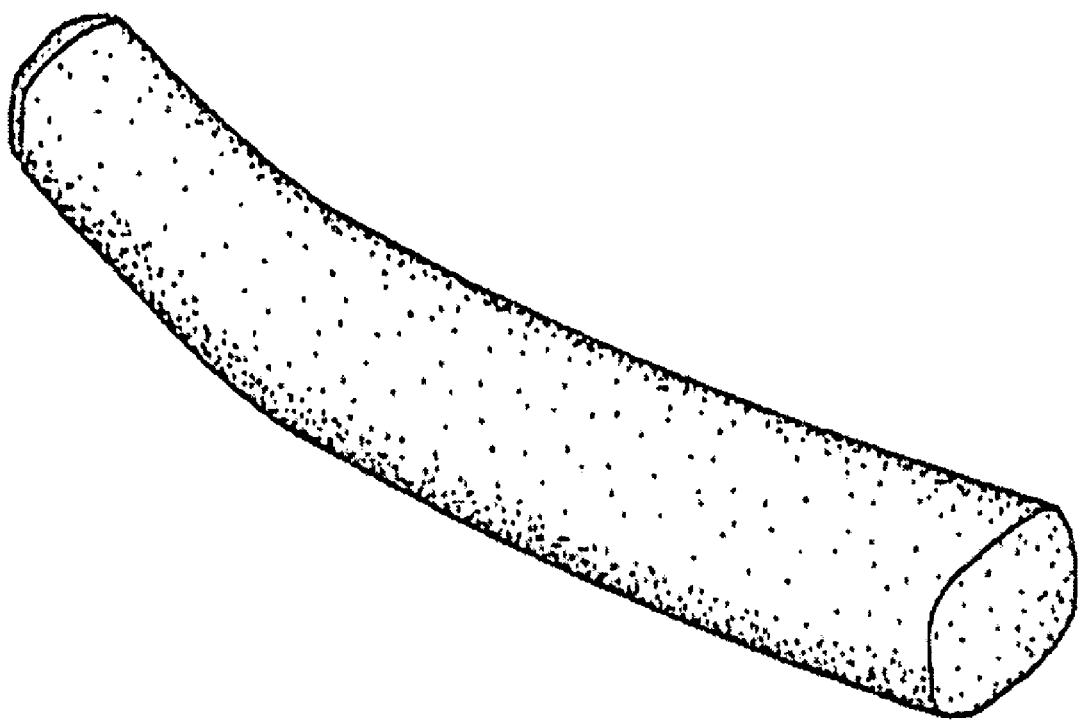

BLEACHED EXPANDED PIGSKIN AND PRODUCTS

This application is a continuation-in-part of U.S. application Ser. No. 10/731,257, filed Dec. 9, 2003 now U.S. Pat. No. 6,827,041, which application claimed priority to application number 02157220.8, filed Dec. 20, 2002 in the People's Republic of China.

FIELD OF THE INVENTION

The present invention relates to processing pigskin, which skin is used to make such products such as pet (animal) chews and treats.

BACKGROUND OF THE INVENTION

Dog treats and chews are given to dogs for a variety of reasons. Dog chews are used to help clean the teeth of dogs. Dog treats may have the same cleaning function, as well as provide nutritional value.

Many dog chews are made from rawhide, which is untanned cow skin. The skin is dehaired and cleaned of fat and muscle. The rawhide may be bleached with hydrogen peroxide to improve its appearance. The skin is then manipulated into the desired shape, such as by folding or rolling, and dried.

The problem with rawhide is that it is indigestible, being essentially leather. Dogs lack the enzymes needed to digest the rawhide. When a dog chews rawhide, pieces can break off and lodge in the dog's digestive tract. In some cases, an occlusion, or blockage, as well as impaction, occurs, requiring veterinary attention. Furthermore, rawhide is low in palatability, so that dogs quickly lose interest in it.

An alternative to rawhide chews and treats are pigskin products. Pigskin is digestible and has some nutritional value. Pigskin stimulates the dog's gastrointestinal tract to produce digestive enzymes. Thus, pieces that enter the digestive tract of dogs do not cause problems.

Furthermore, pigskin is generally used for other products other than pet chews and treats. The production of leather creates leftovers or scrapes of skin that can be used for colloidal protein and for making pet supply products.

Untanned pigskin is so unsightly that humans are unlikely to purchase products made from it. In order to increase the visual attractiveness of dog chews and treats, the pigskin product is smoked. Smoking imparts a browning color to the skin. Unfortunately, smoking increases the acidity of the product, thereby reducing its palatability to dogs. The product may be coated with molasses or other things to alleviate the smoke flavor, but these coatings are easily licked off because the coating does not penetrate the skin product. The remaining product is then discarded by lack of interest by dogs.

In addition, pigskin is different from rawhide so that some of the processes used for rawhide do not work well for pigskin. Pigskin contains oils and impurities not found in rawhide and the skin fiber is different.

Thus, what is needed is a pigskin suitable for use in dog products, which pigskin is both attractive to humans and palatable to dogs.

SUMMARY OF THE INVENTION

The present invention provides a method of making an animal treat or chew product. Pigskin is provided and processed with a lime alkali paste. The paste is applied to the skin to dissolve colloidal protein therein. The paste comprises an alkali liquid, alkali enzymes and lime. The alkali is removed from the skin. The skin is washed in enzymes to soften and expand the skin. The skin is bleached with hydrogen peroxide or potassium permanganate. The skin is formed into the animal product.

In accordance with one aspect of the present invention the step of applying a paste to the skin further comprises the step of applying a paste comprising a concentration of alkali liquid of 10–30% by weight of sodium sulfide, lime and 0.01–0.05% by weight of alkali enzymes and applying the paste to the skin for 10–30 hours.

In accordance with another aspect of the present invention the step of removing the alkali from the skin further comprises the step of washing the skin in ammonium chloride or ammonium sulfate.

In accordance with still another aspect of the present invention, the step of washing the skin in enzymes, further comprises the step of washing the skin in the enzymes and an alkali remover.

In accordance with still another aspect of the present invention, the step of bleaching the skin with hydrogen peroxide or potassium permanganate further comprises the step of washing the skin in 15–30% by weight of hydrogen peroxide for 0.5–5 hours.

In accordance with another aspect of the present invention the processed pigskin is expanded, white and soft.

In accordance with still another aspect of the present invention, fat is removed from the skin after the skin has been softened and expanded.

BRIEF DESCRIPTION OF THE DRAWINGS

The FIGURE is a perspective view of a dog product made with the pigskin of the present invention.

DESCRIPTION OF THE PREFERRED EMBODIMENT

The foreign priority application number 02157220.8, filed Dec. 29, 2002 in the People's Republic of China is hereby incorporated by reference.

The present invention processes pigskin which can be used in a variety of dog products such as chews and treats. The pigskin products is attractive to humans because it is low in oil, light in color and uniform in appearance. Because the oil content of the skin is greatly reduced, products made with the skin have a longer shelf life. In addition, the pigskin products are highly palatable to dogs and are chewable and digestible.

The pigskin is taken from a pig or hog. Although any part of the skin can be used, the preferred invention preferably uses the skin, or hide, from the body, excluding the head and limbs. After stripping the skin off of the pig, the skin is dipped in a lime liquid. The skin swells and allows the hair to be removed. The skin is sliced by removing the outside layer which outside layer is used for leather products. The remaining, or other, layers of skin are considered scraps. The invention processes these layers, increasing the value of the scraps. The remaining layers of the skin has a water content of about 50–80% by weight.

In the description that follows, all percentages are given by weight. When discussing various chemicals used to process the pigskin, the percentages are by weight of the pigskin before treatment.

The pigskin can be fresh or preserved. Fresh pigskin is recently removed from the pig. Other than the liming step discussed above, no other processing has occurred. Preserved pigskin is skin removed from the pig, processed to some degree and then preserved by drying, salting, etc., in order to prevent deterioration. Alternatively, the pigskin can be in various other stages of freshness or preservation.

The skin is contacted with an alkali mixture to dissolve the colloidal protein therein. The mixture is 10–40% of sodium sulphide, 0.01–0.05% of alkali enzymes and a sufficient quantity of lime to raise the pH of the mixture to above or equal to 12. Typical commercially available alkali enzymes are sold under the names Nowolase DG and Nowolase NUE0.6MPX. As an alternative to sodium sulphide, sodium hydroxide or other alkali liquids can be used. A quantity of water is added to the mixture to form a mushy paste. The mixture is applied to both sides of the pigskin. Typically, the mixture is applied to the top of a skin. Then, another skin is laid on top of the first skin and the mixture is applied to the next skin, and so on, stacking the skins. The skin may not be of a uniform thickness. The skin is typically thicker along the back and thinner along the body. The paste is daubed on thicker along the thicker portions of skin. The paste is kept in contact with the skin for an extended period of time, such as 10–30 hours, until the colloidal protein in the skin is dissolved.

In the remaining steps, the skins are agitated. Agitation is provided by rotating drums. The drums rotate about a horizontal axis at relatively low speeds, that is about 16 rpm. The drums have agitators therein, typically in the form of ribs on the inside surfaces of the drums. The ribs lift and drop the skin relative to the chemicals, causing agitation thereof. The skins can be processed in a single drum, wherein the various chemical baths are changed, or the skins can be moved from one drum to the next and so on for each step of the process.

Throughout the process described herein, the temperature is between 10–40 degrees Celsius (C).

After being stacked with the alkali mixture for an extended period of time, the skins, which look dirty, are loaded into a drum. The skins are washed in water to remove the alkali mixture and the colloidal protein. The protein is disposed of in accordance with accepted procedures.

Then, the skins are treated to remove the alkali mixture that has penetrated into the skins. The removal of the alkali mixture is done in two steps. First, the skins are washed with liquid ammonium chloride or ammonium sulfate. In the preferred embodiment, the skins are agitated by a rotating drum with 1–2% ammonium chloride for 0.5–3 hours. The pH is reduced to about 6.

The skins are then rinsed with water for 0.5–3 hours.

The second step to remove the alkali mixture agitates the skins with liquid ammonium chloride (or ammonium sulfate) and enzymes. In the preferred embodiment, the enzymes used are pancreatic enzymes, such as steapsin, lipase, or zymine. Alternatively, the enzyme can be 1398 protein enzyme, which is commercially available. Other commercially available enzymes include Nowolase NS, Nowolase NG, Nowolase NB, Nowolase PE, Oropon OO, Oropon G and Oropon OR. The skin is agitated for 3–8 hours. In the preferred embodiment, 4–10% ammonium chloride and 0.1–0.5% pancreatic enzymes are used. In this step, not only is alkali removed, but the enzymes soften and expand the skin.

Removing the colloidal protein from the skin creates voids or vacuoles inside the skin. These voids are located either inside of fibers or between the fibers, or both, inside and between the fibers. It is believed that the enzymes alter the fibers in the skin. It is believed that an outer layer of each fiber is broken. The fiber, previously constrained by the outer layer, expands from the action of the enzymes breaking the outer layer. The skin likewise expands in all three dimensions. This expansion is in addition to the swelling of the skin, which swelling occurred from immersion in lime liquid.

The two steps for removing the alkali can vary in time and depend on the concentration and quantity of the chemicals, the temperature of the components inside the drum and the speed that the drum turns. The worker or operator can adjust the times as needed.

Next, the fat and oil is removed from the skin by agitating the skin with sodium carbonate, or soda ash, and degrease materials. The degrease materials can be a detergent, soap or surfactant. In the preferred embodiment, 1–3% sodium carbonate and 0.3–1% degrease materials are used. Then, the skin is rinsed with water.

Next, the skin is bleached by agitating the skin with 15–30% hydrogen peroxide (or potassium permanganate or other bleaching agent) for 0.5–5 hours. The hydrogen peroxide not only whitens the skin, but also assists in maintaining the expanded condition of the skin. The hydrogen peroxide and water enter and reside in the voids in the skin. The end result is a skin that is white, expanded, soft and low in oil. The skin is pleasant in appearance to humans and has a high palatability to dogs.

The skin is pressed to reduce the amount of water therein. Then it is cut and shaped and manipulated while still wet to form the desired product. For example, a sheet of skin can be rolled and the ends tied in overhand knots to form a bone shape. Other products and shapes can be made. Alternatively, pieces of skin can be put into a mold and pressed into a shape (see the FIGURE). The product can be a variety of shapes such as a dog bone, a rib (shown in the FIGURE), a pork chop, etc.

Once the product has been shaped, the product is dried with heat. In the preferred embodiment, the product is dried at a controlled rate to maintain the skin in its expanded condition. The product is dried in an oven for one week at 40–50 degrees C. and then for 12–24 hours at 70–80 degrees C.

Alternatively, the pigskin can be ground or cut up (either in its raw, unprocessed condition or after processing). The pieces of processed pigskin can then be molded or pressed into a desired shape. An adhesive mixture, such as a rice-based glue, can be used to maintain the pigskin pieces together.

As discussed above, the palatability of the processed pigskin is high. Digestion of the processed pigskin by dogs is also easier than with unprocessed pigskin. The stool has a more uniform appearance. Prior art pigskin products have a rough surface texture. Products using the processed pigskin have a smoother surface texture, which increases its palatability to the dogs. The processed pigskin is easier for dogs to chew. As dogs age, their teeth become more fragile. The processed pigskin is suitable for all dogs, from young aggressive chewers to older, milder chewers. Furthermore, prior art pigskin products contain oil. The processed pigskin has a low oil content. Thus, the shelf life of the product is longer, as oil rancidity is minimized and the product will not stain carpet, furniture, etc.

Products made with the processed pigskin can be enhanced with coatings or bastings. The coatings or bastings enhance palatability to dogs even more. Examples of coatings or bastings include sugar (such as red sugar), meat broths, mint and chlorophyll. These compounds not only coat the skin, but enter the voids inside the skin and remain when the skin is dried. The product can thus contain a quantity of a taste or breath enhancing compound that is not easily licked off, as with mere surface coatings. Mint and chlorophyll sweeten a dog's breath.

Furthermore, the processed pigskin can be used alone or in combination with other materials, such as meat (for example, beef, chicken or pork).

The following examples are given to illustrate the process:

EXAMPLE 1

Using the second, third and fourth layers of dehaired pigskin with a moisture content of 50–80% by weight, the skin is processed with an alkali mixture. A mixture of 10–30% sodium sulphide, 0.01–0.5% alkali enzymes and lime is made up. The quantity of lime is such that the pH is greater than or equal to 12. This mixture or mass is daubed on the pigskin. The pigskin is allowed to stand in stacks for 10–30 hours. The pigskin is then rinsed in water in a rotating drum. The alkali is removed in two steps. The first step agitates the pigskin with 1–2.5% ammonium chloride for 0.5–3 hours. The pigskin is then rinsed with water. The second step agitates the pigskin with 4–10% ammonium chloride and 0.1–0.5% pancreatic enzymes (zymine) for 4–6 hours to further remove the alkali and to soften the skin. Then, the pigskin is processed to take off the fat by agitating with 1–3% sodium carbonate and 0.3–1% degrease materials. The skin is rinsed with water and agitated with 15–30% hydrogen peroxide for 0.5–5 hours. After bleaching, the skin is pressed to reduce the water, cut and shaped into products and then dried.

EXAMPLE 2

The second, third and fourth layers of dehaired pigskin with a moisture content of 60% is used. An alkali mixture is made up of 1 Kg (kilogram) of sodium sulphide, 300 g (grams) alkali enzymes, 1.5 Kg water and 3 Kg lime. This mixture is then applied to 1000 Kg of pigskin. The pigskin remains in contact with the mixture for 20 hours, after which the pigskin is washed in water for 1–3 hours. Then, the pigskin is soaked in 20 Kg liquid ammonium chloride for 1 hour. The pigskin is washed in water for 0.5–3 hours. Then, the pigskin is agitated in 80 Kg liquid ammonium chloride and 1 Kg pancreatic enzymes (zymine) for 5 hours. After rising with water for 0.5–3 hours, the pigskin is then agitated in a liquid of 25 Kg of sodium carbonate and 5 Kg degrease material to remove the fat. The pigskin is then washed in water. Then, the pigskin is agitated with 240 Kg of 27.5% hydrogen peroxide in a drum. The drum is turned for 2 hours and then stopped for 2 hours. The turning-stopping process is repeated several times. The drum is stopped and the pigskin remains in the stationary drum overnight (12 hours). The bleached skins are removed from the drum, pressed to get rid of excess water, cut and used to make products and finally dried.

The use of enzymes, such as pancreatic or protein enzymes, changes the characteristics of the pigskin. The fibers in the skin remain strong, so that the skin is not easily pulled or broken apart and presents resistance to a chewing dog. Yet, the fibers are soft and pliable. Treating the pigskin with hydrogen peroxide, without the enzymes, produces brittle fibers that are weak.

Treating the skin with enzymes expands the skin. Once expanded, the expansion is maintained by filling the voids and then drying the skin so as to prevent collapse of the skin. Drying the skin in the sun typically leads to a collapse of the skin.

The foregoing disclosure and showings made in the drawings are merely illustrative of the principles of this invention and are not to be interpreted in a limiting sense.

The invention claimed is:

1. A method of making an animal treat or chew product, comprising the steps of:
    a) providing pigskin;
    b) lime-alkali processing the skin by applying a paste to the skin until colloidal protein in the skin is dissolved, the paste comprising a mixture of alkali liquid, alkali enzymes and lime;
    c) removing the alkali from the skin;
    d) washing the skin in enzymes to soften and expand the skin;
    e) bleaching the skins with hydrogen peroxide or potassium permanganate;
    f) forming the skin into the animal product.

2. The method of claim 1 wherein the step of applying a paste to the skin further comprises the step of applying a paste comprising a concentration of alkali liquid of 10–30% by weight of sodium sulfide, lime and 0.01–0.05% by weight of alkali enzymes and applying the paste to the skin for 10–30 hours.

3. The method of claim 1 wherein the step of removing the alkali from the skin further comprises the step of washing the skin in ammonium chloride or ammonium sulfate.

4. The method of claim 1 wherein the step of washing the skin in enzymes further comprises the step of washing the skin in the enzymes and an alkali remover.

5. The method of claim 1 wherein the step of bleaching the skin with hydrogen peroxide or potassium permanganate further comprises the step of washing the skin in 15–30% by weight of hydrogen peroxide for 0.5–5 hours.

6. The method of claim 1 wherein the processed pigskin is expanded, white and soft.

7. The method of claim 1 further comprising the step of removing fat from the skin after the skin has been softened and expanded.

8. The method of claim 1 wherein the paste has a pH of at least 12.

9. The method of claim 1 wherein:
    a) the step of applying a paste to the skin further comprises the step of applying a paste comprising a concentration of alkali liquid of 10–30% by weight of sodium sulfide, lime and 0.01–0.05% by weight of alkali enzymes and applying the paste to the skin for 10–30 hours;
    b) the step of removing the alkali from the skin further comprises the step of washing the skin in ammonium chloride or ammonium sulfate;
    c) the step of washing the skin in enzymes further comprises the step of washing the skin in the enzymes and an alkali remover;
    d) the step of bleaching the skin with hydrogen peroxide or potassium permanganate further comprises the step of washing the skin in 15–30% by weight of hydrogen peroxide for 0.5–5 hours.

* * * * *